United States Patent
Xu et al.

(10) Patent No.: US 9,917,852 B1
(45) Date of Patent: Mar. 13, 2018

(54) DGA BEHAVIOR DETECTION

(71) Applicant: Palo Alto Networks, Inc., Santa Clara, CA (US)

(72) Inventors: Wei Xu, Santa Clara, CA (US); Xin Ouyang, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 223 days.

(21) Appl. No.: 14/754,489

(22) Filed: Jun. 29, 2015

(51) Int. Cl.
*H04L 29/06* (2006.01)

(52) U.S. Cl.
CPC ...... *H04L 63/1416* (2013.01); *H04L 63/0236* (2013.01); *H04L 63/1425* (2013.01); *H04L 63/1483* (2013.01)

(58) Field of Classification Search
CPC ............. H04L 63/1416; H04L 63/1483; H04L 63/1466
See application file for complete search history.

(56) References Cited

U.S. PATENT DOCUMENTS

| | | | |
|---|---|---|---|
| 7,467,410 B2 | 12/2008 | Graham et al. | |
| 7,934,254 B2 | 4/2011 | Graham et al. | |
| 8,141,157 B2 | 3/2012 | Farley et al. | |
| 9,356,942 B1 * | 5/2016 | Joffe | H04L 63/1408 |
| 9,363,282 B1 * | 6/2016 | Yu | H04L 63/1425 |
| 2006/0212925 A1 | 9/2006 | Shull et al. | |
| 2008/0028463 A1 * | 1/2008 | Dagon | H04L 29/12066 726/22 |
| 2010/0192225 A1 | 7/2010 | Ma et al. | |
| 2013/0174253 A1 * | 7/2013 | Thomas | H04L 63/1416 726/22 |
| 2013/0191915 A1 * | 7/2013 | Antonakakis | H04L 63/14 726/23 |
| 2014/0013434 A1 * | 1/2014 | Ranum | H04L 63/145 726/24 |
| 2014/0068763 A1 | 3/2014 | Ward et al. | |
| 2014/0068775 A1 | 3/2014 | Ward et al. | |
| 2014/0075558 A1 | 3/2014 | Ward et al. | |
| 2014/0090058 A1 | 3/2014 | Ward et al. | |
| 2014/0283063 A1 * | 9/2014 | Thompson | H04L 63/145 726/23 |

OTHER PUBLICATIONS

Xu et al., We Know it Before You Do: Predicting Malicious Domains, Sep. 2014.
(Continued)

*Primary Examiner* — Ellen Tran
(74) *Attorney, Agent, or Firm* — Van Pelt, Yi & James LLP

(57) ABSTRACT

Techniques for Domain Generation Algorithm (DGA) behavior detection are provided. In some embodiments, a system, process, and/or computer program product for DGA behavior detection includes receiving passive Domain Name System (DNS) data that comprises a plurality of DNS responses at a security device; and applying a signature to the passive DNS data to detect DGA behavior, in which applying the signature to the passive DNS data to detect DGA behavior further comprises: parsing each of the plurality of DNS responses to determine whether one or more of the plurality of DNS responses correspond to a non-existent domain (NXDOMAIN) response.

20 Claims, 8 Drawing Sheets

(56) References Cited

OTHER PUBLICATIONS

Mustafa Toprak, Intrusion Detection System Alert Correlation with Operating System Level Logs, Dec. 11, 2009.
Antonakakis et al., DGAs and Cyber-Criminals: A Case Study, 2012.
Martin Rataj, Simulation of Botnet C&C Channels, 2014.
Shehar Bano, A Study of Botnets: Systemization of Knowledge and Correlation-based Detection, Oct. 2012.
Ivan Nikolaev, Network Service Anomaly Detection, Jun. 2014.
Sebastian Garcia, Identifying, Modeling and Detecting Botnet Behaviors in the Network, Nov. 2014.
Alan Shaikh, Botnet Analysis and Detection System, Nov. 2010.

* cited by examiner

| | | Dashboard | ACC | Monitor | Policies | Objects | Network | Device |
|---|---|---|---|---|---|---|---|---|

400 ⟶

🔍 | (threatid eq 40040)

| | | Receive Time | Type | Name | ID |
|---|---|---|---|---|---|
| 📄 | ▶ | 02/17 11:58:18 | vulnerability | DGA NXDOMAIN response Found | 40040 |
| 📄 | ▶ | 02/17 11:58:17 | vulnerability | DGA NXDOMAIN response Found | 40040 |
| 📄 | ▶ | 02/17 11:58:17 | vulnerability | DGA NXDOMAIN response Found | 40040 |
| 📄 | ▶ | 02/17 11:58:17 | vulnerability | DGA NXDOMAIN response Found | 40040 |
| 📄 | ▶ | 02/17 11:58:17 | vulnerability | DGA NXDOMAIN response Found | 40040 |
| 📄 | ▶ | 02/17 11:58:17 | vulnerability | DGA NXDOMAIN response Found | 40040 |
| 📄 | ▶ | 02/17 11:58:17 | vulnerability | DGA NXDOMAIN response Found | 40040 |
| 📄 | ▶ | 02/17 11:58:17 | vulnerability | DGA NXDOMAIN response Found | 40040 |
| 📄 | ▶ | 02/17 11:58:17 | vulnerability | DGA NXDOMAIN response Found | 40040 |

FIG. 4

DGA BEHAVIOR DETECTION

BACKGROUND OF THE INVENTION

Malicious software (malware) generally refers to unwanted, hostile, or intrusive software that can be used to disrupt computer or network operations, collect private or sensitive information, or access private computer systems or networks. Malware can be in the form of executable code, scripts, active content, and other software. Example malware includes computer viruses, worms, Trojan horses, rootkits, keyloggers, spyware, adware, botnet command and control (C&C) related malware, and other unwanted, hostile, or intrusive software.

Security solutions (e.g., security devices or appliances, which can provide firewall solutions) can be used to safeguard against malware. For example, a firewall can identify and prevent the further spread of malware in a network.

A firewall generally protects networks from unauthorized access while permitting authorized communications to pass through the firewall. A firewall is typically implemented as a device or a set of devices, or software executed on a device, such as a computer or appliance, that provides a firewall function for network access. For example, firewalls can be integrated into operating systems of devices (e.g., computers, smart phones, tablets, or other types of network communication capable devices). Firewalls can also be integrated into or executed as software on servers, gateways, network/routing devices (e.g., network routers), or appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

FIG. 4 illustrates a screen shot of a report generated by a security device performing DGA behavior detection using a signature for DGA behavior detection in accordance with some embodiments.

DETAILED DESCRIPTION

Figure 1:
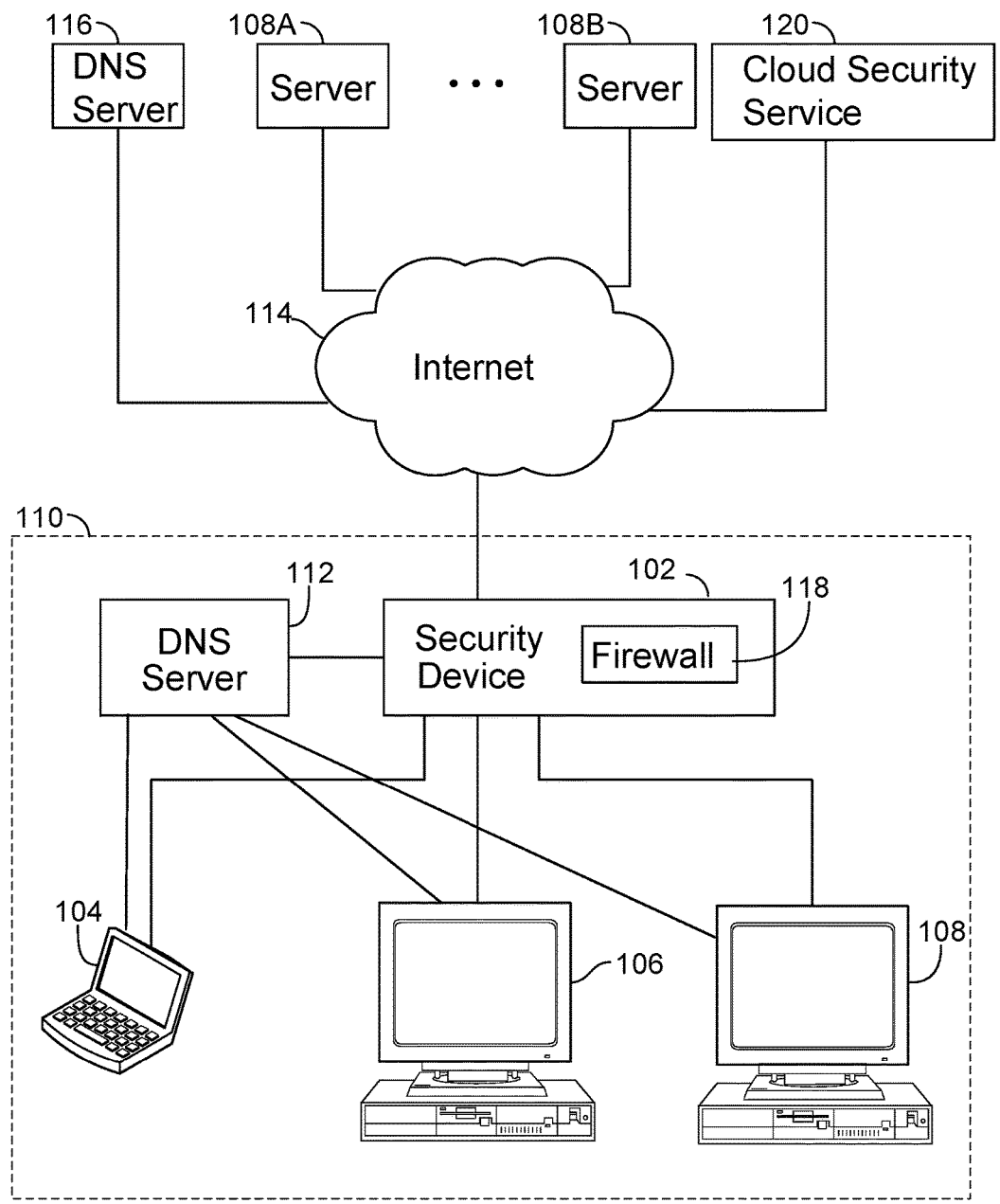
FIG. 1 is a functional block diagram illustrating an architecture for Domain Generation Algorithm (DGA) behavior detection in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Malicious software (malware) generally refers to unwanted, hostile, or intrusive software that can be used to disrupt computer or network operations, collect private or sensitive information, or access private computer systems or networks. Malware can be in the form of executable code, scripts, active content, and other software. Example malware includes computer viruses, worms, Trojan horses, rootkits, keyloggers, spyware, adware, botnet command and control (C&C) related malware, and other unwanted, hostile, or intrusive software.

Security solutions (e.g., security devices or appliances, which can provide firewall solutions) can be used to safeguard against malware. For example, a firewall can identify and prevent the further spread of malware in a network.

A firewall generally protects networks from unauthorized access while permitting authorized communications to pass through the firewall. A firewall is typically implemented as a device or a set of devices, or software executed on a device, such as a computer or appliance, that provides a firewall function for network access. For example, firewalls can be integrated into operating systems of devices (e.g., computers, smart phones, tablets, or other types of network communication capable devices). Firewalls can also be integrated into or executed as software on servers, gateways, network/routing devices (e.g., network routers), or appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

A network domain generally refers to a domain that is identified by a domain name. A domain name typically includes an identification string (e.g., www.example-website.com) that defines a realm of authority or control for a domain on the Internet. Domain names are generally formed by rules and procedures of the Domain Name System (DNS). A domain name can be registered in the DNS as a domain name.

Network domains can be used in various networking contexts and application-specific naming and addressing purposes. For example, a domain name can be used to identify an Internet Protocol (IP) resource, such as a web site (e.g., a server hosting a web site), or any other service accessible via the Internet (e.g., a File Transfer Protocol (FTP) resource or other services accessible via the Internet).

A DNS service can be used to translate a domain name into an IP address. For example, when a user types in a domain name (e.g., an Internet or Intranet domain name), such as example.com, using a web browser, an authoritative DNS server can translate the domain name into an IP address, such as 172.16.254.1 (for IPv4) and 2001:db8:0:1234:0:567:8:1 (for IPv6). However, if a user attempts to perform a DNS lookup or host command on an unregistered or invalid domain name, such as examplefakedomain.com, then an error can be received indicating that such is a non-existing domain name, or in other words, that such is a non-existent domain (NXDOMAIN). Generally, an NXDOMAIN (e.g., an NXDOMAIN response received in response to a DNS query for a given domain name) is a condition or error that can be indicated for an Internet domain name that is unable to be resolved using the DNS servers (e.g., invalid domain name) or that the Internet domain name is not yet registered. In some cases, an NXDOMAIN can also be indicated due to a network or DNS server problem.

Network domains can also be used by malware. For example, malware can be distributed or propagated using a network domain, such as www.bad-malware-download-site.com. As another example, botnet C&C related malware can be associated with a network domain, such as www.botnetsite.com. Various commercial efforts as well as open project efforts exist to provide listings of network domains (e.g., bad/malware domains) that are known to be used to distribute or propagate malware. Some approaches use such network domain listings (e.g., bad/malware domain listings) to provide spoofed replies, in response to any requests to a network domain on such a listing, as a mechanism for preventing propagation of malware distribution.

Blackholing is a technique that can be used to send all traffic (e.g., network communications) to a network domain (e.g., DNS or IP address) to a null interface or non-existent server (e.g., sometimes referred to as a black hole). For example, an Internet Service Provider (ISP) can manage such blackholing for efficiency and to avoid affecting network connectivity. However, while blackholing may be efficient for certain types of severe network attacks, such an approach fails to allow for analysis of the traffic to the blackholed network domain.

Sinkholing generally refers to a technique for routing traffic (e.g., network communications) to a valid IP address. For example, a security device (e.g., a network device, which can be implemented using a server or appliance) associated with the valid IP address can receive the traffic that was directed (e.g., redirected) to the sinkholed IP address that is associated with the network domain. The security device that receives the traffic can analyze the traffic. Based on the analysis of the traffic, the security device can then perform an action (e.g., reject bad packets or perform some other action).

For example, malware, such as C&C malware and/or other types of malware, can generate many different network domains, such as by using Domain Generation Algorithms (DGAs). Generally, malware utilizes the DGA approach to generate many different domain names for evasion detection purposes and take-down evasion purposes, and that are not actually or frequently used to attempt to connect to by many or any of the malware samples executing in the wild.

However, existing approaches fail to accurately and/or efficiently identify DGA behavior on a network (e.g., an enterprise IP-based network or other network). Also, existing approaches fail to determine whether a given host device that is sending DNS queries to non-existent network domains (e.g., NXDOMAINs) may be infected with DGA malware (e.g., including a previously new or not yet identified, known version of DGA malware executing on the host device).

What are needed are new and improved techniques for identifying and monitoring DGA behavior on a network.

Accordingly, techniques for Domain Generation Algorithm (DGA) behavior detection are provided.

In one embodiment, techniques are disclosed for detecting DGA behavior based on passive DNS data (e.g., DNS responses received at a security device, such as a firewall appliance, can be parsed to identify NXDOMAIN responses). For example, the disclosed techniques can monitor and detect consecutive NXDOMAIN responses that are generally exhibited when a DGA malware-infected machine (e.g., host device) attempts to communicate with a potential C&C (C2) server(s).

In one embodiment, techniques are disclosed for detecting DGA behavior using a signature (e.g., an Intrusion Prevention System (IPS) signature). Given the popularity of DGA malware, the disclosed signature-based techniques can also be used to identify host devices (e.g., hosts can include client devices, servers, and/or other devices that can communicate over the Internet) that are infected by various DGA malware (e.g., including for new or unknown malware, such as for DGA malware that the network/security device or cloud security service does not yet have a malware signature for specifically detecting and/or identifying).

In some embodiments, a system, process, and/or computer program product for DGA behavior detection includes receiving passive Domain Name System (DNS) data that comprises a plurality of DNS responses at a security device; and applying a signature (e.g., an IPS signature) to the passive DNS data to detect DGA behavior, in which applying the signature to the passive DNS data to detect DGA behavior further comprises: parsing each of the plurality of DNS responses to determine whether one or more of the plurality of DNS responses correspond to a non-existent domain (NXDOMAIN) response. For example, the NXDOMAIN response is in response to a DNS query from a host device for an NXDOMAIN, and the NXDOMAIN response includes a destination IP address that corresponds to the host device (e.g., a plurality of NXDOMAIN responses can be received at the security device, and one or more distinct host devices can be determined based on distinct IP addresses associated with one or more of the plurality of NXDOMAIN responses received at the security device).

In one embodiment, applying the signature to the passive DNS data to detect DGA behavior further includes determining whether a threshold number of NXDOMAIN responses are received at the security device.

In one embodiment, applying the signature to the passive DNS data to detect DGA behavior further includes determining whether a threshold number of NXDOMAIN responses are received at the security device within a predetermined period of time (e.g., an interval).

In one embodiment, a system, process, and/or computer program product for DGA behavior detection further includes determining that a first domain name is a DGA generated domain name based on detected DGA behavior using the signature, in which the first domain name is associated with at least one of the one or more NXDOMAIN responses.

In one embodiment, a system, process, and/or computer program product for DGA behavior detection further includes determining that a first domain name is a DGA generated domain name based on detected DGA behavior using the signature, in which the first domain name is associated with at least one of the one or more NXDOMAIN responses; and sinkholing the first domain name using a sinkholed IP address.

In one embodiment, a system, process, and/or computer program product for DGA behavior detection further includes determining that a first domain name is a DGA generated domain name based on detected DGA behavior using the signature, in which the first domain name is associated with at least one of the one or more NXDOMAIN responses; and sinkholing the first domain name using the security device to redirect any host device that attempts to connect to the first domain name to a sinkholed IP address (e.g., the sinkholed IP address can be associated with the security device, a server on the enterprise network, or a server of a cloud security service).

In one embodiment, a system, process, and/or computer program product for DGA behavior detection further includes determining that a first domain name is a DGA generated domain name based on detected DGA behavior using the signature, in which the first domain name is associated with at least one of the one or more NXDOMAIN responses; sinkholing the first domain name using a sinkholed IP address; and monitoring network activity redirected to the sinkholed IP address.

In one embodiment, a system, process, and/or computer program product for DGA behavior detection further includes determining that a first domain name is a DGA generated domain name based on detected DGA behavior using the signature, in which the first domain name is associated with at least one of the one or more NXDOMAIN responses; sinkholing the first domain name using a sinkholed IP address; and identifying a first host device that is infected with malware based on an attempt by the first host device to connect to the first domain name, in which the first host device is redirected to the sinkholed IP address in response to the attempt by the first host device to connect to the first domain name.

In one embodiment, a system, process, and/or computer program product for DGA behavior detection further includes determining that a first domain name is a DGA generated domain name based on detected DGA behavior using the signature, in which the first domain name is associated with at least one of the one or more NXDOMAIN responses; sinkholing the first domain name using a sinkholed IP address; and generating a report and/or a log for each attempted host device connection that is redirected to the sinkholed IP address.

In one embodiment, a system, process, and/or computer program product for DGA behavior detection further includes determining that a first domain name is a DGA generated domain name based on detected DGA behavior using the signature, in which the first domain name is associated with at least one of the one or more NXDOMAIN responses; sinkholing the first domain name using a sinkholed IP address; and reporting one or more host devices that attempt to connect to the sinkholed IP address.

In one embodiment, a system, process, and/or computer program product for DGA behavior detection further includes determining that a first domain name is a DGA generated domain name based on detected DGA behavior using the signature, in which the first domain name is associated with at least one of the one or more NXDOMAIN responses; determining one or more host devices that attempted to connect to the first domain name; and performing an action in response to determining the one or more host devices that attempted to connect to the first domain name (e.g., block, redirect, log, report, quarantine, and/or perform another action to respond to the determination that such host(s) may be infected with DGA malware, C&C malware, and/or other malware).

In one embodiment, a system, process, and/or computer program product for DGA behavior detection further includes applying an IPS signature to the passive DNS data to detect DGA behavior that comprises determining whether the signature is triggered a threshold number of times within a predetermined period of time (e.g., interval). An example burst of 38 NXDOMAIN responses have been observed in a 60 second period of time/interval while monitoring an actual enterprise network environment in which DGA behavior was detected using the disclosed techniques. As such, an example threshold number of times can be configured to equal a value of 10, and an example predetermined period of time/interval can be configured to equal 60 seconds, and/or other values can be configured for the threshold and the period of time/interval settings for the signature (e.g., as would now be apparent to one of ordinary skill in the art, these settings can be tuned based on observed DGA behaviors, which can vary over time or for different network environments, and tuned to avoid or minimize false positives while still effectively detecting DGA behavior in the network environments). In an example implementation, the IPS signature includes a child signature and a parent signature, in which the child signature detects NXDOMAIN responses (e.g., in some implementations, the child signature can perform additional analysis of the NXDOMAIN responses to refine the triggering of the child signature to avoid/reduce false positives as further described below), and the parent signature determines whether the child signature is triggered a threshold number of times within a predetermined period of time/interval, such as further described below.

In an example implementation, the child signature detects whether the DNS response is an NXDOMAIN response and can perform various other further analyses of the domain name that is associated with the DNS response that corresponds to an NXDOMAIN response. For example, the child signature can also verify that the Top-Level Domain (TLD) of the domain name (e.g., a malformed TLD check rule can be performed for analyzing the TLD of the domain name that was queried that resulted in the NXDOMAIN response) is of length one, two, or three (e.g., as a TLD is determined to be invalid/malformed if the length of the TLD is equal to zero or is greater than three, and as a result, NXDOMAINs that are in response to such domain names can be disregarded as such an invalid TLD is not likely to be generated by DGA malware). For example, a malfunctioning printer on a network (e.g., a networked printer that keeps sending DNS requests) would generally not trigger this rule (e.g., such NXDOMAINs would be disregarded when the above-described malformed TLD check rule is applied) as it is more likely that such a malfunctioning printer would typically send DNS requests that had such invalid/malformed TLDs. As another example, typographical errors by users when attempting to enter a URL in a web browser would not trigger this rule (e.g., such NXDOMAINs would be disregarded when the above-described malformed TLD check rule is applied) if the user's typographical resulted in such an invalid/malformed TLD in the domain name of the user typed URL in the web browser URL field. As another example, certain applications/services (e.g., Netflix) can use long hostnames for parallel video streaming/other purposes, and can send in bursts, and as a result, would not trigger this rule (e.g., such NXDOMAINs would be disregarded when the above-described malformed TLD check rule is applied).

In another example implementation, the child signature detects whether the DNS response is an NXDOMAIN response and can perform various other further analyses of the domain name that is associated with the DNS response that corresponds to an NXDOMAIN response. For example, the child signature can also determine whether the TLD of the domain name is on a list of valid TLDs (e.g., a valid TLD check rule can determine whether the TLD of the domain name that was queried is on a list of white listed TLDs). If so, then the DNS response is disregarded (e.g., not counted as being associated with DGA behavior).

In another example implementation, the child signature detects whether the DNS response is an NXDOMAIN response and can perform various other further analyses of the domain name that is associated with the DNS response that corresponds to an NXDOMAIN response. For example, the child signature can also determine whether the domain name comprises only two segments (e.g., a two-segment check rule can verify that the domain name only includes two segments, such as abc.ru or abc.com, which are in the form of hostname.TLD).

In an example implementation, the child signature detects whether the DNS response is an NXDOMAIN response and can perform various other further analyses of the domain name that is associated with the DNS response that corresponds to an NXDOMAIN response. For example, the child signature can also determine whether the domain name is on a list of known dynamic DNS (e.g., a dynamic DNS check rule can determine whether the domain name that was queried is on a list of (known/approved) dynamic DNS). If so, then the DNS response is disregarded (e.g., not counted as being associated with DGA behavior).

In another example implementation, the child signature detects whether the DNS response is an NXDOMAIN response and can perform various other further analysis of the domain name that is associated with the DNS response. For example, the child signature can also perform a combination of two or more of the above-described techniques for further analysis of the domain name that is associated with the DNS response.

In one embodiment, a system, process, and/or computer program product for DGA behavior detection further includes performing an entropy analysis in a host name portion of a domain name associated with the NXDOMAIN response. For example, it has been observed that DGAs often use random host names in their generated domain names. In an example implementation, the entropy analysis can be used to facilitate DGA behavior detection (e.g., implemented using an entropy check rule in the child signature, which can be implemented using well known techniques for calculating the entropy, more specifically, Shannon entropy, from information contained in a message which in this case is the host name being analyzed for the entropy check) as further described below.

In one embodiment, a system, process, and/or computer program product for DGA behavior detection further includes performing a dictionary analysis in a host name portion of a domain name associated with the NXDOMAIN response. For example, it has been observed that DGAs often use combinations of dictionary words in their generated domain names. In an example implementation, the dictionary analysis can be used to facilitate DGA behavior detection (e.g., implemented using a dictionary check rule in the child signature) as further described below. In one embodiment, the dictionary analysis can be implemented by performing a dictionary word check to check if the hostname can be broken into multiple known dictionary words (e.g., English dictionary words for domain names in English), in which the checking operation can performed by querying a set of known English words to see if any given string exists in the set of known English words.

In one embodiment, various sinkholing techniques are performed to monitor DGA malware behavior. For example, a sinkholed IP address can be a valid IP address that is associated with, for example, a server or appliance controlled by the cloud security service provider and can be used to redirect network communication attempts originally directed to a bad network domain (e.g., a domain name associated with DGA behavior using the disclosed techniques) to the sinkholed IP address. The server or appliance can be configured with various open multiple ports, such as port 80, port 8080, port 344, and/or other ports, and can also be configured to listen for connection requests. The cloud security service provider can thereby monitor and log attempts by host devices (e.g., clients or other computing devices) to connect to the sinkholed bad network domain (e.g., a network domain associated with the detected DGA behavior). Accordingly, this approach allows the cloud security service provider to identify host devices that are infected with malware (e.g., DGA malware) based on the logged attempts by such host devices (e.g., logging session records, which can be stored for analysis and reporting) to connect to the sinkholed bad network domain.

As another example, traffic from hosts (e.g., host devices, such as a computer, laptop, tablet, smart phone, server and/or another type of computing device) that is redirected to the sinkholed IP address can be analyzed by a security device controlled by the security entity, which can then, for example, determine which host devices attempted to connect to that bad network domain (e.g., log which clients attempted to connect to the bad network domain and how many times) and/or perform various other actions. In an example implementation, the cloud security service provides a security device that is configured with the sinkholed IP address, and the security device is further configured to not provide any responses to requests from the infected hosts except for completing an initial connection setup (e.g., TCP handshake).

In one embodiment, a system, process, and/or computer program product for DGA behavior detection further includes generating a log and/or a report for each attempted host connection to the sinkholed IP address. For example, the log and/or report can be used to determine which hosts are infected with malware based on the indication that such hosts attempted to connect to the sinkholed IP address.

In one embodiment, a first domain name is determined to be associated with DGA behavior (e.g., based on monitoring of a DGA malware sample in an emulation environment using a cloud security service, such as described further below), and the first domain name is registered with a domain registry to the sinkholed IP address in order to sinkhole the first domain name.

In one embodiment, a system, process, and/or computer program product for DGA behavior detection further includes determining that a first domain name is a registered network domain; and changing the registered domain name for the first domain name with a domain registry to a new IP address in order to sinkhole the first domain name using the new IP address, in which the new IP address corresponds to the sinkholed IP address.

In one embodiment, a system, process, and/or computer program product for DGA behavior detection further includes generating one or more signatures (e.g., DNS signatures that can be generated based on monitoring of a DGA malware sample in an emulation environment using a cloud security service, such as described further below) for a plurality of bad network domains, in which the bad network domains are determined to be associated with the DGA behavior. In one embodiment, a system, process, and/or computer program product for DGA behavior detection further includes distributing the one or more signatures to a plurality of security devices (e.g., network devices that perform one or more security functions such as a firewall function, such as firewall appliances or other network devices).

In one embodiment, a system, process, and/or computer program product for DGA behavior detection further includes sending a malware sample to a cloud security service for analysis, in which the malware sample is associated with the DGA behavior. For example, the cloud security service can receive a malware sample from the security device (e.g., a security appliance or other security device that includes a firewall). The malware sample can be automatically analyzed using various techniques, including executing the malware sample in a virtual execution environment to monitor network activities in order to identify network domains that the malware sample attempts to connect to during execution. If the malware sample is determined to be malware (e.g., identified DGA malware), then these network domains can then be determined to be bad network domains associated (e.g., uniquely associated) with the identified malware. As a result, a malware signature can be generated for the identified malware, which can be published to a plurality of security devices (e.g., security devices that are used by customers of the cloud security service). The malware signature can then be used by the security devices to identify such malware executing in another network environment. In some cases, a signature (e.g., a DNS signature) can be generated for each of these bad network domains that are associated with C&C behavior of the malware sample. The security cloud service can distribute the signature(s) to a plurality of security devices (e.g., security devices that are used by customers of the cloud security service). The DNS signatures can then be used by the cloud security service to identify candidate bad network domains for sinkholing based on a number of attempts by hosts that trigger each such signature (e.g., based on a number of hosts that attempt to connect to a particular bad network domain). This approach can be used to identify candidate bad network domains for sinkholing using various techniques further described herein, which also allows for a more efficient and focused sinkholing of bad network domains (e.g., as malware can generate many different network domains, such as by using domain generation algorithms (DGAs), many of which are generated for evasion detection purposes and take-down evasion purposes, and are not actually or frequently used to attempt to connect to by many or any of the malware samples executing in the wild).

In one embodiment, a system, process, and/or computer program product for DGA behavior detection further includes applying a signature for determining that a threshold number of NXDOMAIN responses was received at the security device within a predetermined period of time. For example, determining that a threshold number of NXDOMAIN responses was received at the security device within a predetermined period of time can be implemented using traffic analysis techniques (e.g., an IPS signature that is implemented using a firewall, in which the DNS signature was generated for identifying NXDOMAIN responses). This approach can be used to detect DGA behavior on the network (e.g., enterprise network on which the security device is monitoring network traffic, including passive DNS data, such as described further below). In some implementations, if a threshold number of NXDOMAIN responses was received at the security device within a predetermined period of time (e.g., requiring a threshold number of NXDOMAIN responses received at the security device within the predetermined period of time can be used to disregard noise that can result from mistyped network domain queries and/or other DNS errors that are not typically associated with DGA behavior, and/or various other additional analysis techniques can be applied to more efficiently and more accurately identify NXDOMAIN responses that are likely a result of DGA behavior as further described below), then DGA behavior can be accurately and efficiently detected using such techniques as further described herein. This approach can also be used to identify host devices that are associated with the detected DGA behavior (e.g., even if the DGA malware is not yet known or identified by the cloud security service), such as further described herein.

These and other examples and techniques for DGA behavior detection will now be further described below.

FIG. 1 is a functional block diagram illustrating an architecture for Domain Generation Algorithm (DGA) behavior detection in accordance with some embodiments. As shown, a security device 102 is at the perimeter of a protected network 110 (e.g., an enterprise network), which includes client devices (e.g., clients) 104, 106, and 108. For example, security device 102 can include a firewall function, such as firewall 118 as shown, to protect the network and various computing devices (e.g., client devices, servers, and/or other computing devices) within network 110, which is in communication with the Internet 114 and various servers, such as DNS server 116, and other Internet resources/servers shown as 108A and 108B (e.g., web servers, mail servers, file servers such as an FTP server, and/or other types of resources/servers). For example, security device 102 can be implemented as a data appliance or a server that can perform various security functions, including firewall 118. Security device 102 is also in communication with a cloud security service 120 via Internet 114 as shown. In some implementations, security device 102 is implemented using a data appliance (e.g., a security appliance), a gateway (e.g., a security server), a server (e.g., a server that executes security software including firewall 118), and/or some other security device, which, for example, can be implemented using computing hardware, software, or various combinations thereof.

In some implementations, one or more of clients 104, 106, and 108 can include a firewall (e.g., host-based firewall). For example, clients 104, 106, and 108 can include various computing devices that can access the Internet via wired and/or wireless communications, such as computers, laptops, tablets, smart phones, and/or various other types of computing devices with network communication capabilities. As is also shown, Internet resources/servers shown as 108A and 108B are in communication with the Internet 114. For example, a client device can access a service provided by a server via the Internet, such as a web related service (e.g., web sites, cloud-based services, streaming services, or email services), peer-to-peer related service (e.g., file sharing), IRC service (e.g., chat service), and/or any other service that can be delivered via the Internet.

As is also shown in FIG. 1, clients 104, 106, and 108 are also in communication with a local DNS server 112 of network 110. For example, DNS server 112 can perform a DNS service to translate a domain name into an IP address. For example, when a user types in a domain name (e.g., an Internet or Intranet domain name), such as example.com, using a web browser on a client (e.g., client 104, 106, or 108), an authoritative DNS server can translate the domain name into an IP address, such as 172.16.254.1 (for IPv4) and 2001:db8:0:1234:0:567:8:1 (for IPv6). If DNS server 112 does not have a locally cached result for the requested domain name, then DNS server 112 can communicate to another DNS server, such as DNS server 116 via Internet 114 to obtain the translation for the domain name into an IP address (e.g., note that the communication between DNS server 112 and DNS server 116 passes through security device 102 as shown). In contrast, DNS requests from clients 104, 106, and 108 to local DNS server 112 are not required to pass through security device 102 as shown for the network architecture for network 110. As similarly discussed above, if a user or client attempts to perform a DNS lookup or host command on an unregistered or invalid domain name, such as examplefakedomain.com, then an error can be received indicating that such is a non-existing domain name, or in other words, that such is a non-existent domain (NXDOMAIN).

In particular, security device 102 can be used for implementing various techniques for DGA behavior detection as described herein with respect to various embodiments. For example, security device 102 can implement/apply a signature(s) (e.g., an IPS signature(s), such as described above and further described below) for detecting DGA behavior based on monitoring DNS responses for NXDOMAIN responses. As another example, security device 102 can facilitate sinkholing of a network domain (e.g., a bad network domain) that was determined to be associated with an NXDOMAIN response that triggered the signature for detecting DGA behavior on the network.

In one embodiment, sinkholing bad network domains using the disclosed techniques can be implemented using security device 102 and cloud security service 120. For example, security device 102 (e.g., an integrated security appliance/gateway/server) can communicate with cloud security service 120 (e.g., using secure communications, such as encrypted communication techniques using standard or well-known encryption protocols) to receive security related content updates (e.g., DNS related signature(s), bad network domain related signature(s), and/or policy(ies)/rule (s)) and/or to provide malware samples, logged information (e.g., logged attempts to communicate to bad network domains observed based on triggered bad network domain signatures and/or DNS/IPS signatures), and/or other information. As another example, cloud security service 120 (e.g., using secure communications, such as encrypted communication techniques using standard or well-known encryption protocols) can report (e.g., to a network or security administrator associated with network 110) that a host (e.g., client device 104, 106, or 108) is infected with malware based on a logged attempt(s) by that host(s) to communicate with a sinkholed IP address that is associated with a bad network domain. As will now be apparent, some or all of the functions described above with respect to FIG. 1 can be assisted by or implemented in whole or in part by cloud security service 120. In some implementations, cloud security service 120 can, for example, reduce the processing on security device 102.

Figure 2:
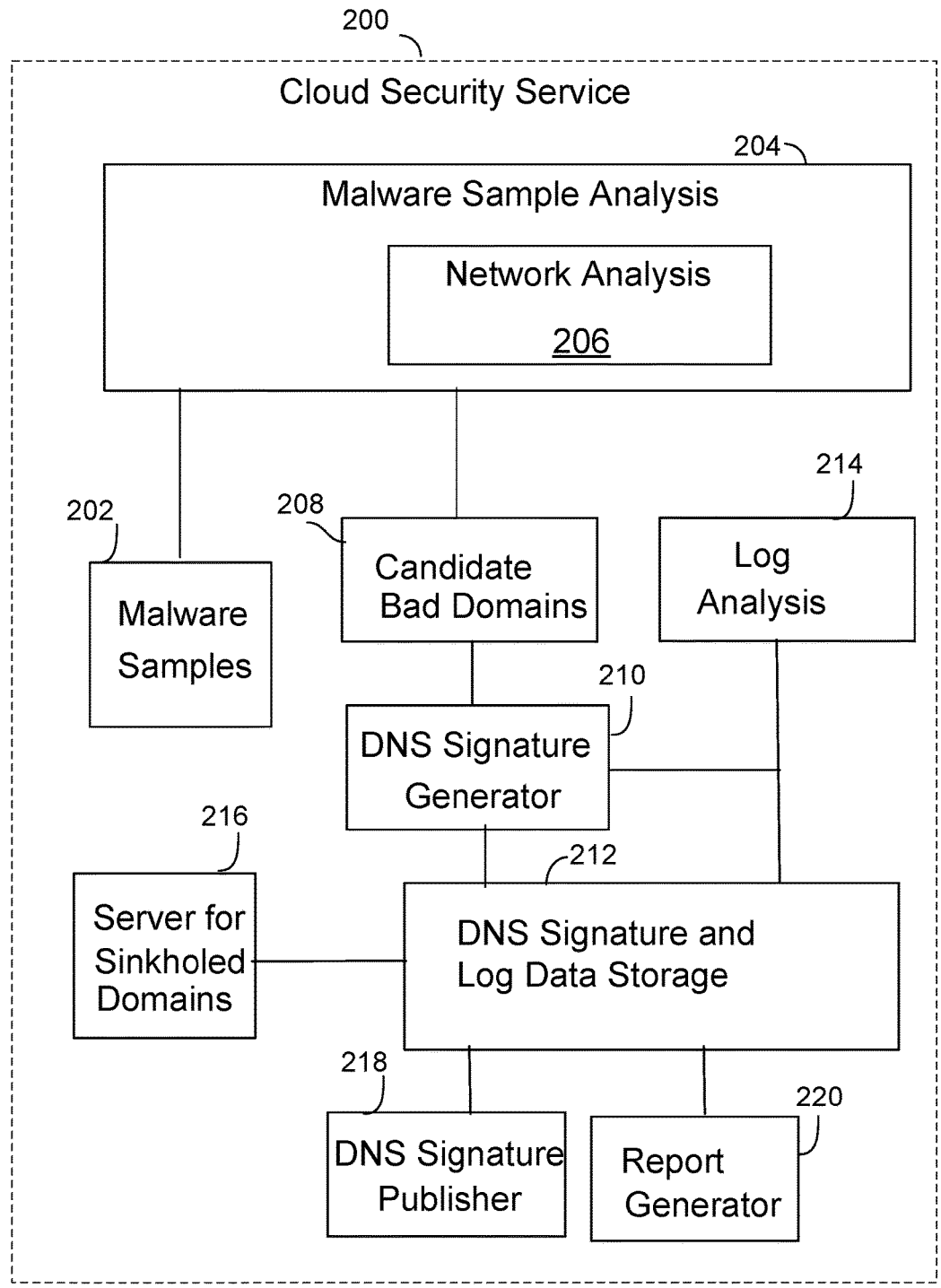
FIG. 2 is a functional block diagram illustrating a cloud security service for DGA behavior detection in accordance with some embodiments.

FIG. 2 is a functional block diagram illustrating a cloud security service for DGA behavior detection in accordance with some embodiments. In particular, cloud security service 200 is in communication with the Internet. For example, cloud security service 120 of FIG. 1 can be implemented as cloud security service 200 as shown in FIG. 2.

Referring to FIG. 2, cloud security service 200 includes malware samples 202 (e.g., executable files, Microsoft Office® files, Adobe PDF® files, Java files, and/or other types of files), which can be received from various customers (e.g., firewall 118 as shown in FIG. 1 and/or other firewalls or security devices from one or more customers of the cloud security service). Malware samples 202 are provided to malware sample analysis 204. Malware sample analysis 204 includes a network analysis component 206. For example, when executing a malware sample using the malware sample analysis 204, which can be implemented as a virtualized environment for dynamic analysis of malware, whether the malware sample is determined to be malware can be performed using various malware detection techniques (e.g., based on identification of malicious behaviors, such as malicious network activity, exploits, software vulnerabilities, and/or other malicious behaviors including using heuristic-based behavioral analysis techniques). For example, if a malware sample is determined to be malware based on the malware sample analysis, the malware sample can be identified and a new malware signature can be automatically generated, which can be distributed to security devices that receive malware signature updates. Also, malware sample analysis 204, using network analysis component 206, can identify malware domains (if any) that the malware sample attempts to access, which can be logged and sent to candidate bad network domains 208 (e.g., by logging all DNS/domain query traffic during emulation of the identified malware, which generates a source of candidate bad network domains list associated with the identified malware). For example, whether each of the candidate bad network domains has been registered (e.g., by the malware developer) can be determined (e.g., if a DNS lookup receives an NXDOMAIN response, then it can be determined that the candidate bad network domain has not been registered). In some implementations, the cloud security service can register any such unregistered bad network domains to sinkhole such bad network domains (e.g., using sinkholed IP addresses, that is, valid IP addresses that are associated with, for example, one or more servers controlled by cloud security service 200, such as server 216 as shown). This approach also can uniquely associate an identified malware sample with one or more bad network domains, such that a host attempt to connect to such bad network domains (e.g., NXDOMAINS) can be used to determine that such hosts are infected with the identified malware sample (e.g., an identified DGA/C&C malware sample). For example, such signatures are triggered by a client device (e.g., client device 104, 106, or 108 as shown in FIG. 1) attempting to connect to such an NXDOMAIN that triggers a signature implemented by the local firewall (e.g., firewall 118 as shown in FIG. 1), which can then also be used to determine that the client device is infected with identified malware, such that a responsive action can be performed (e.g., the client device can be disinfected, quarantined, reported to a network/security administrator for the network, the client device's attempt(s) to connect to the bad network domains(s) can be blocked, and/or some other responsive action can be performed based on policy, such as a firewall policy).

In other cases, further analysis can be performed to determine which of the bad network domains should be identified for DNS signatures and/or registered for sinkholing, as further described below. In some implementations, cloud security service 200 uses a signature generator 210 to generate signatures for bad domains 208 detected based on monitoring one or more malware samples using the disclosed techniques, such as further described below. These signatures are stored in a DNS signature and log data storage 212 (e.g., in some implementations, log data and signature data can be stored in separate data stores, such as different databases or other types of data stores) and can be distributed to security devices (e.g., security devices that include firewalls, such as security device 102 of FIG. 1) of customers of cloud security service 200 using a signature publisher 218. For example, if during emulation analysis of malware-Sample-X (e.g., including logging DNS traffic during an instrumented virtualized emulation of malware-Sample-X), that malware sample attempts to connect to malware-bad-site-1.com, malware-bad-site-2.com, and malware-bad-site-3.com, then signatures (e.g., DNS signatures) can be generated for each of those candidate bad network domains. These signatures can be sent to firewalls of multiple customers of cloud security service 200, which can then log and report back to cloud security service 200 any attempts that such customer firewalls identify hosts attempting to connect to any of such bad network domains, which can also be stored in signature and log data storage 212. In an example implementation, log analysis engine 214 can also periodically analyze such received log data to determine which of such logged bad network domains are bad network domains that malware-Sample-X (e.g., executing in the wild) actually attempts or more commonly attempts to connect to in order to focus on such logged bad network domains for sinkholing. Based on this further analysis to focus on the most relevant/commonly observed in the wild bad network domains, the cloud security service can then register such unregistered bad network domains, or (if already registered by the malware developer) attempt to change the registration, to sinkhole such bad network domains (e.g., using sinkholed IP addresses that are associated with one or more servers controlled by cloud security service 200, such as server 216 as shown). Thus, such further analysis can be used to determine which of the candidate bad network domains should be registered for sinkholing, which can be a more efficient approach as malware sometimes uses DGA techniques and other malware detection evasion techniques as discussed above. Accordingly, this approach allows cloud security service 200 to selectively register or change DNS registrations on bad network domains that were observed to have exceeded, for example, a threshold number of attempted hits (e.g., queries for attempted connections, such as during a predefined period of time) by hosts (e.g., infected with the identified malware performing in the wild).

As is also shown in FIG. 2, cloud security service 200 provides a server 216 (e.g., or multiple servers or appliances) that can be associated with one or more sinkholed IP addresses for bad network domains using the above-described techniques. Any attempts by hosts (e.g., clients 104, 106, or 108 as shown in FIG. 1, or other hosts, even if such are hosts that are not associated with customers of the cloud security service, assuming that a given bad network domain is registered to a sinkholed IP address associated with the cloud security service provider) can be determined using server for sinkholed domains 216 and logged to DNS signature and log data storage 212 (e.g., or in some implementations, stored in a separate data store). Cloud security service 200 can uniquely associate a malware sample (e.g., an identified malware sample) with one or more bad network domains, such that host attempts to connect to such bad network domains can be used to determine that such hosts are infected with the malware (e.g., the identified malware). Report generator (reporting) component 220 is configured to automatically report to customers (e.g., or others who may not be current customers) which host(s) are infected with identified malware based on logged attempts to connect to sinkholed IP addresses that are associated with bad network domains.

As another example, a security device (e.g., security device 102 as shown in FIG. 1) can monitor network communications from hosts (e.g., host devices, such as a computer, laptop, tablet, smart phone, server, and/or another type of computing device) and apply a DNS signature that can determine whether to redirect a request to connect to a given domain name to a sinkholed IP address (e.g., associated with server for sinkholed domains 216 of cloud security service 200 as shown in FIG. 2). As such, network communications from hosts that are redirected to the sinkholed IP address can be analyzed by the cloud security service, which can then, for example, determine which host devices attempted to connect to that bad network domain (e.g., log which clients attempted to connect to the bad network domain and how many times) and/or perform various other actions. In this example implementation, the cloud security service provides the computing device that is configured with the sinkholed IP address (e.g., server for sinkholed domains 216 of cloud security service 200 as shown in FIG. 2), and the security device (e.g., security device 102 as shown in FIG. 1) is further configured to not provide any response to requests from the infected hosts except for completing an initial connection setup (e.g., TCP handshake).

Figure 3:
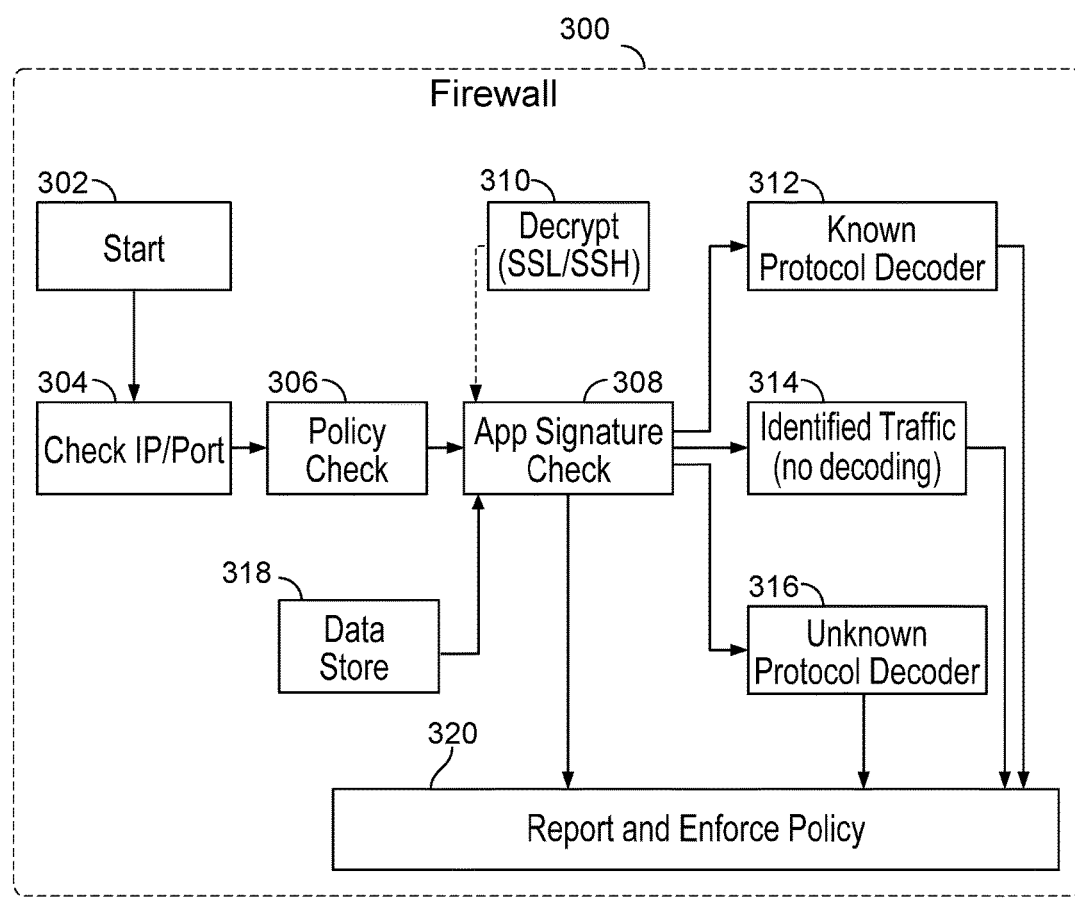
FIG. 3 is a functional block diagram illustrating a firewall for DGA behavior detection in accordance with some embodiments.

FIG. 3 is a functional block diagram illustrating a firewall for DGA behavior detection in accordance with some embodiments. In particular, security device 300 is in communication with the Internet. For example, firewall 118 of FIG. 1 can be implemented as firewall 300 as shown in FIG. 3.

In one embodiment, network traffic is monitored using a server (e.g., a computer server that includes security functions, such as a firewall executed on a processor(s) of the computer server). In one embodiment, network traffic is monitored using an appliance (e.g., a data appliance that includes security functions, such as a security appliance that includes a firewall executed on a processor(s) of the appliance). In one embodiment, network traffic is monitored using a gateway (e.g., a gateway that includes security functions, such as a security gateway). In one embodiment, network traffic is monitored using a host (e.g., security software executed on a host device, such as a network server or client computing device, such as a personal computer, laptop, tablet, or smart phone). In one embodiment, the network traffic is monitored using pass through (e.g., in-line) monitoring techniques. In one embodiment, the network traffic is collected and/or monitored for events and/or reporting based on events (e.g., some of the network traffic can be monitored using pass through techniques and/or some of the network traffic can be collected and analyzed for monitoring the network traffic offline, such as in logs of network traffic) as further described herein with respect to various embodiments.

In one embodiment, network traffic is monitored using a state-based firewall. In particular, the state-based firewall can monitor traffic flows using an APP-ID engine, shown as App Signature Check component 308. For example, the monitored network traffic can include HTTP traffic, FTP traffic, DNS traffic (e.g., DNS request(s) and/or DNS response(s)), unclassified application traffic (e.g., unknown application traffic), and/or other types of traffic (e.g., traffic using other types of known or unknown protocols).

Referring to FIG. 3, network traffic monitoring begins at 302. An IP address and port component 304 determines an IP address and port number for a monitored traffic flow (e.g., a session) based on packet analysis. A policy check component 306 determines whether any policies can be applied based on the IP address and port number. As is also shown in FIG. 3, an application (app) signature check component 308 identifies an application (e.g., using an APP-ID component using various application signatures for identifying applications based on packet flow analysis). For example, APP-ID component 308 can be configured to determine what type of traffic the session involves, such as HTTP traffic, FTP traffic, DNS traffic (e.g., DNS request(s) and/or DNS response(s)), unknown traffic, and various other types of traffic, and such classified traffic can be directed to an appropriate decoder, such as decoders 312, 314, and 316, to decode the classified traffic for each monitored session's traffic flow.

As similarly described above, DNS signatures and/or IPS signatures can be applied at APP-ID component 308 using data store 318. In an example implementation, the data store can also store a table, list, or other data formatted store of other information that can be applied by the above-described IPS signature, including, for example, a list of valid TLDs and/or a list of valid dynamic DNS (DDNS or DynDNS). In this example implementation, the data store can also store a table, list, or other data formatted store of bad domains, which can be in the form of signatures, such as DNS signatures. For example, bad domains can be periodically received (e.g., daily, hourly, or based on some other period of time or upon request) from a cloud security service (e.g., cloud security service 120 of FIG. 1) that provides firewall 300 with content updates (e.g., including signature updates, such as bad domain data including DNS signatures). In some implementations, data store 318 can be implemented as part of application (app) signature check component (308), which can be implemented during protocol decoding (312), instead of during app signature check (308). In addition, if the monitored traffic is encrypted (e.g., encrypted using SSL, SSH, or another known encryption protocol), then the monitored traffic can be decrypted using a decrypt component 310 (e.g., applying man in the middle techniques using a self-signed certificate).

In one embodiment, a known protocol decoder component 312 decodes and analyzes traffic flows using known protocols (e.g., applying various signatures for the known protocol). For example, known protocol decoder component 312 decodes and analyzes traffic flows using the DNS protocol (e.g., NXDOMAIN responses can be checked in real-time with the path decoder provided by known protocol decoder component 312) to facilitate identifying DNS responses that include an NXDOMAIN response and to track the source IP address and destination IP address associated with the NXDOMAIN response. In an example implementation, the disclosed IPS signature (e.g., implemented using a child signature and parent signature, such as further described herein) can be performed using known protocol decoder component 312 (e.g., in communication with app signature check 308 and data store 318, such as similarly described below) to perform DGA behavior detection based on passive DNS data to identify a threshold number of NXDOMAIN responses received at firewall 300 within a predetermined period of time/interval, such as further described below using the disclosed techniques. If the IPS signature is triggered indicating that DGA behavior was detected on the network, then known protocol decoder component 312 reports the detected DGA behavior to report and enforce policy component 320, such as further described below.

In another example implementation, the above-described IPS signature (e.g., implemented using a child signature and parent signature, such as further described below) can be performed using app signature check component 308 (e.g., in communication with data store 318 and known protocol decoder component 312 to facilitate decoding of passive DNS data, such as similarly described herein) to perform DGA behavior detection based on passive DNS data to identify a threshold number of NXDOMAIN responses received at firewall 300 within a predetermined period of time/interval, such as further described below using the disclosed techniques. If the IPS signature is triggered indicating that DGA behavior was detected on the network, then app signature check component 308 reports the detected DGA behavior to report and enforce policy component 320, such as further described below.

As also shown in FIG. 3, known protocol decoder component 312 also reports the monitored traffic analysis to a report and enforce policy component 320. Identified traffic (no decoding required) component 314 reports the identified traffic to the report and enforce policy component 320. An unknown protocol decoder component 316 decodes and analyzes traffic flows (e.g., applying various heuristics) and reports the monitored traffic analysis to the report and enforce policy component 320. For example, host devices (e.g., identified based on logged destination IP addresses associated with the NXDOMAIN responses that triggered the IPS signature for DGA behavior detection) can be logged and reported based on a policy using report and enforce policy 320 (e.g., a firewall policy can have one or more rules for actions to be performed in response to DGA behavior detection based on the IPS signature for DGA behavior detection being triggered). As another example, triggered DNS signatures can be reported and enforced using report and enforce policy 320.

In some implementations, various other functional architectures and flows are provided to implement the policy enforcement using techniques described herein. For example, some of these functions can be implemented in software executed on a general processor and/or some of these functions can be implemented using hardware acceleration techniques for faster packet processing of network traffic.

FIG. 4 illustrates a screen shot of a report generated by a security device performing DGA behavior detection using a signature for DGA behavior detection in accordance with some embodiments. In one embodiment, a screen shot 400 of a report (e.g., a log or other dashboard report based on monitoring performed by a security device) as shown in FIG. 4 can be generated by a security device to report and/or log when a signature for DGA behavior detection is triggered, such as the security device as shown in FIGS. 1, 3, and/or 5, such as similarly described above.

In one embodiment, a signature for DGA behavior detection is implemented using a child signature and a parent signature. For example, the child signature can detect an NXDOMAIN response and, in some implementations, can perform various analyses on the NXDOMAIN response, such as further described herein. In this example implementation, the parent signature can determine whether the child signature is triggered a threshold number of times within a predetermined period of time (e.g., interval).

An example implementation of the child signature for DGA behavior detection is shown below.

//signature for 36518 [check trigger history]//
<and>
<entry>
<equal-to>
<field>dns-rsp-DGA-NXDOMAIN-found</field>
<value>TRUE</value>
</equal-to>
</entry>
</and>

An example implementation of the signature and the rule for the parent signature for DGA behavior detection is shown below.

//signature for 40040 [check trigger history]//
<and>
<threat-id>36518</threat-id>
</and>
//rule: checks of child signature was triggered the threshold number of times within the interval//
//and also tracks NXDOMAIN responses by source IP address and by destination IP address//
<rule>
<track-by>>src</track-by>
<track-by>>dst</track-by>
<threshold>38</threshold>
<interval>60</interval>
</rule>

In some implementations, various other values can be configured for the threshold and/or interval settings and/or various other information can be tracked by the rule for the signature to implement policy enforcement using techniques described herein. In some implementations, various other functional architectures and flows can be provided to implement the signature for DGA detection using techniques described herein. For example, some of these functions for DGA behavior detection can be implemented in software executed on a general processor and/or some of these functions for DGA behavior detection can be implemented using hardware acceleration techniques for faster performance.

Figure 5:
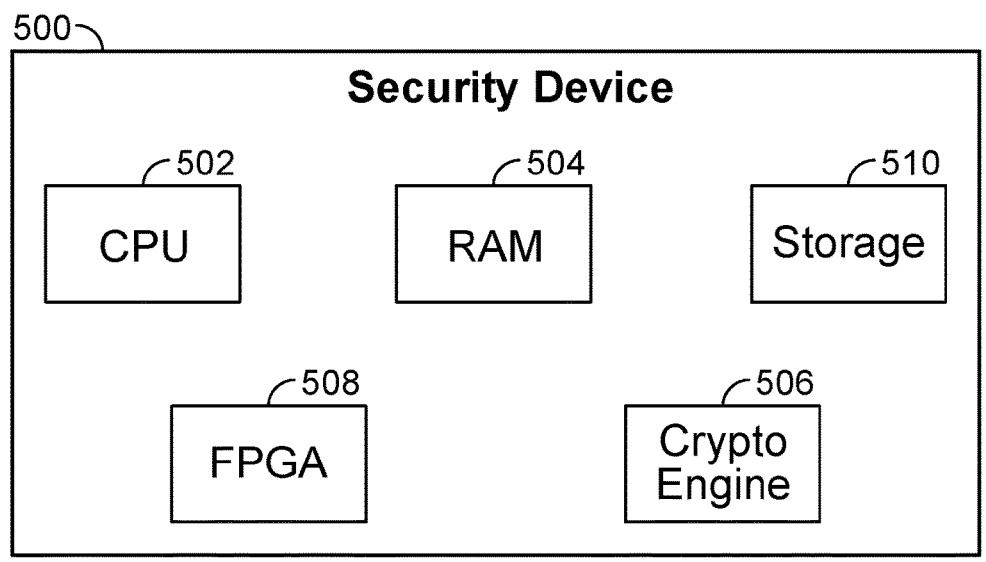
FIG. 5 is a functional diagram of hardware components of a security device for DGA behavior detection in accordance with some embodiments.

FIG. 5 is a functional diagram of hardware components of a security device for DGA behavior detection in accordance with some embodiments. The example shown is a representation of physical components that can be included in security device 500 (e.g., a data appliance, server, gateway, or other computing device). Specifically, security device 500 includes a high performance multi-core CPU 502 and RAM 504. Security device 500 also includes a storage 510 (e.g., one or more hard disks or solid state storage units), which is used to store policy and other configuration information as well as signatures (e.g., IPS signatures, DNS signatures, malware signatures, and/or other signatures that can be used by the security device, such as for firewall related functions). Security device 500 can also include one or more optional hardware accelerators. For example, security device 500 can include a cryptographic component 506 configured to perform encryption and decryption operations, and one or more FPGAs 508 configured to perform signature matching, act as network processors, and/or perform other tasks.

Figure 6:
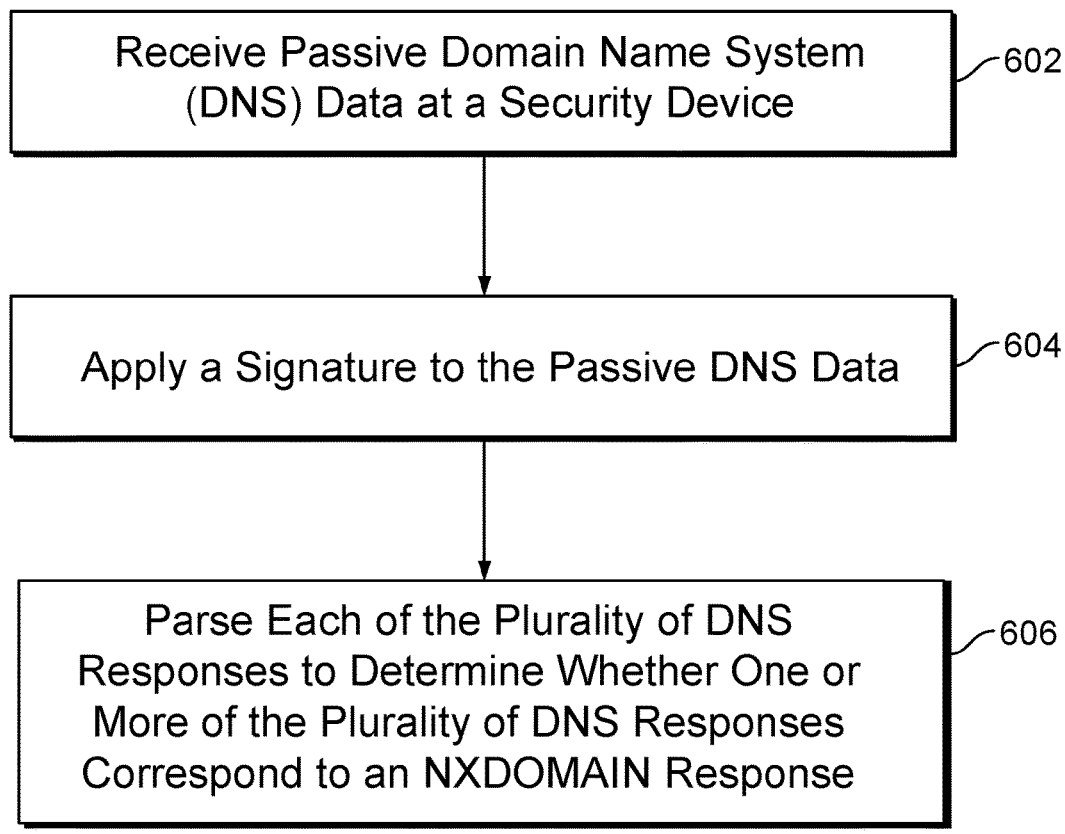
FIG. 6 is a flow diagram illustrating a process for DGA behavior detection in accordance with some embodiments.

FIG. 6 is a flow diagram illustrating a process for DGA behavior detection in accordance with some embodiments. In one embodiment, the process as shown in FIG. 6 can be performed using the security device as shown in FIGS. 1, 3, and/or 5, such as similarly described above.

At 602, passive Domain Name System (DNS) data that comprises a plurality of DNS responses is received at a security device. For example, DNS data can be received by the security device as similarly described above with respect to FIG. 1.

At 604, applying a signature to the passive DNS data is performed to detect DGA behavior. For example, the signature can be implemented as an IPS signature as similarly described above.

At 606, parsing each of the plurality of DNS responses is performed to determine whether one or more of the plurality of DNS responses correspond to a non-existent domain (NXDOMAIN) response. For example, applying the signature to the passive DNS data to detect DGA behavior can include a child signature and a parent signature as similarly described above.

Figure 7:
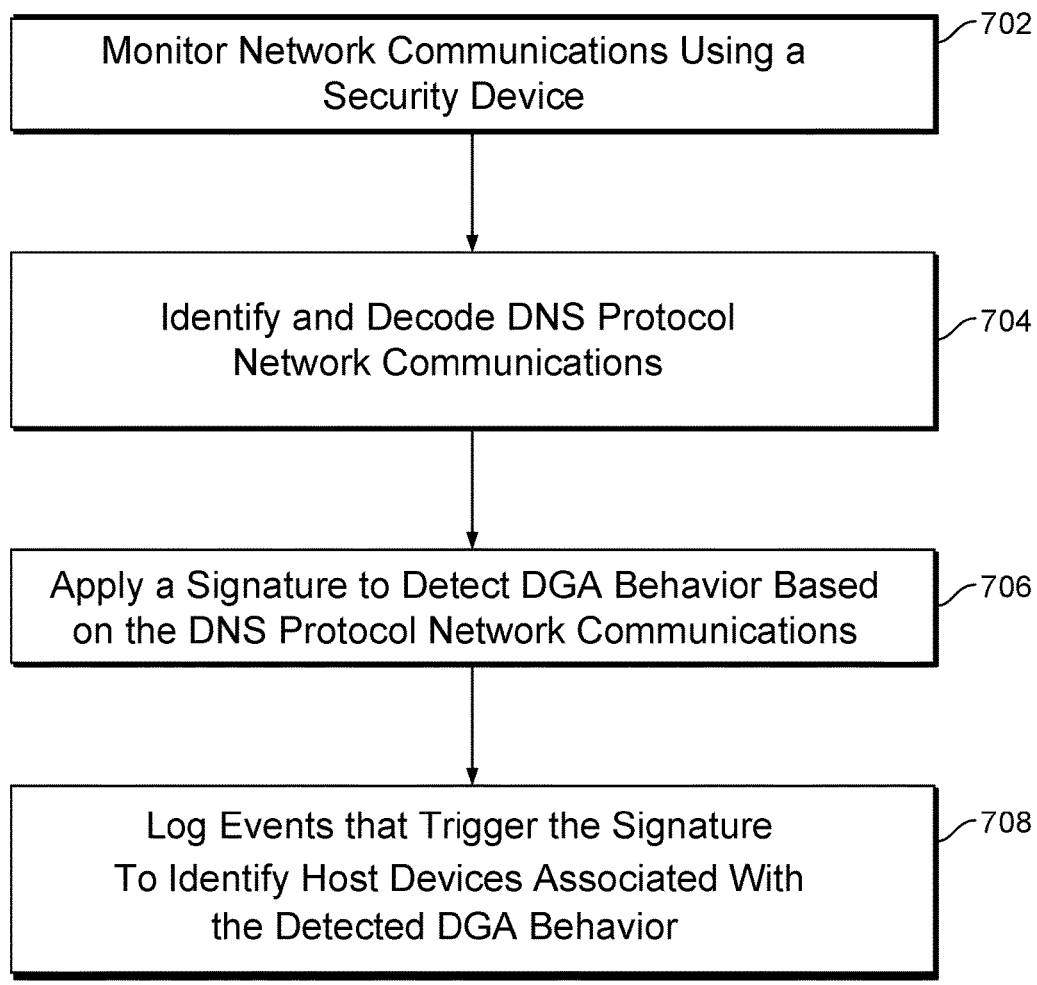
FIG. 7 is another flow diagram illustrating a process for DGA behavior detection in accordance with some embodiments.

FIG. 7 is another flow diagram illustrating a process for DGA behavior detection in accordance with some embodiments. In one embodiment, the process as shown in FIG. 7 can be performed using the security device as shown in FIGS. 1, 3, and/or 5, such as similarly described above.

At 702, network communications (e.g., on a network, such as an enterprise network) are monitored using a security device. For example, network communications can be monitored by the security device as similarly described above with respect to FIGS. 1 and 3.

At 704, DNS protocol network communications are identified and decoded. For example, DNS protocol network communications can be identified and decoded by the security device as similarly described above with respect to FIG. 3.

At 706, a signature is applied to detect DGA behavior based on the DNS protocol network communications. For example, the signature as similarly described above with respect to FIG. 4 can be applied by the security device to perform DGA behavior detection.

At 708, events that trigger the signature are logged to identify host devices associated with the DGA behavior detection. For example, the destination IP addresses of NXDOMAIN responses that triggered the signature can be logged to identify host devices associated with the DGA behavior detection, such as similarly described above with respect to FIG. 4. As such, given the popularity of DGA malware, the disclosed techniques using the signature to detect DGA behavior can be applied to identify many hosts that are infected by various DGA malware even if there are not yet signatures for specifically detecting and/or identifying such DGA malware. In addition, each of such potentially new or unknown/unidentified DGA malware can be provided as malware samples to the cloud security service for further analysis (e.g., emulation using the above described techniques, such as similarly described above with respect to FIG. 2) to facilitate generation of a new signature (e.g., a malware signature) for detecting and/or identifying the DGA malware and/or to facilitate generation of new DNS signatures (e.g., to identify bad domain names that the DGA malware sample attempts to contact during C&C behavior(s) monitored during the emulation, in which such new DNS signatures can be used for URL filtering and/or DNS signatures that can be applied by the security device and/or distributed to other security devices and/or other customers of the cloud security service), such as similarly described above with respect to FIGS. 1-3.

Figure 8:
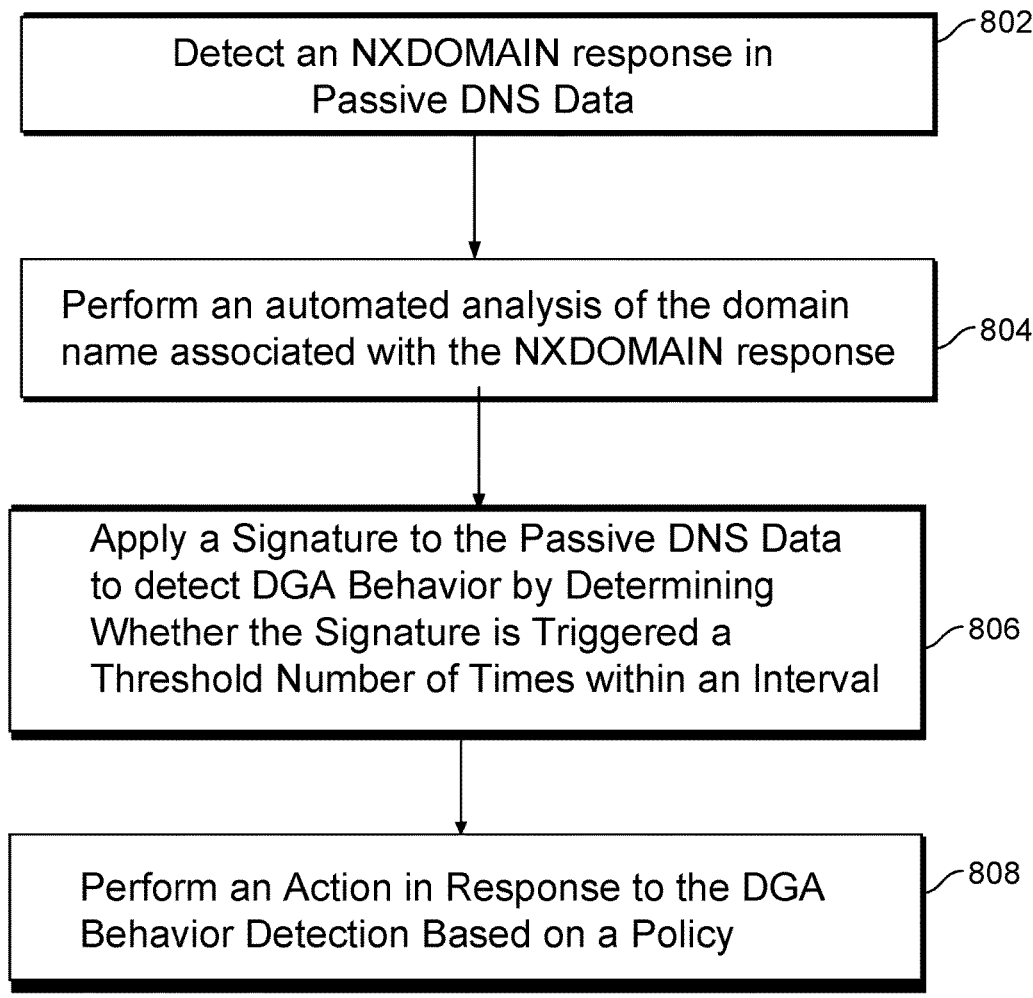
FIG. 8 is another flow diagram illustrating a process for DGA behavior detection in accordance with some embodiments.

FIG. 8 is another flow diagram illustrating a process for DGA behavior detection in accordance with some embodiments. In one embodiment, the process as shown in FIG. 8 can be performed using the security device as shown in FIGS. 1, 3, and/or 5, such as similarly described above.

At 802, detecting an NXDOMAIN RESPONSE in passive Domain Name System (DNS) data is performed using a security device. For example, DNS protocol network communications can be identified and decoded by the security device to detect an NXDOMAIN response as similarly described above with respect to FIG. 3.

At 804, an automated analysis of the domain name associated with the NXDOMAIN response is performed using the security device. In an example implementation, the signature (e.g., child signature, such as described above) detects whether the DNS response is an NXDOMAIN response and can perform various other further analysis of the domain name that is associated with the DNS response. For example, the signature (e.g., child signature) can also check that the Top-Level Domain (TLD) of the domain name is of length one, two, or three (e.g., using the above-described malformed TLD check rule to determine whether the TLD of the domain name being queried is invalid if the length of the TLD is equal to zero or is greater than three, which is disregarded as such an invalid/malformed TLD is not likely to be generated by DGA malware) as similarly described above. In another example implementation, the signature (e.g., child signature, such as described above) can also determine whether the TLD of the domain name is on a list of valid TLDs (e.g., valid TLD check rule can determine whether the TLD of the domain name that was queried is on a list of white listed TLDs) as similarly described above. If so, then the DNS response is disregarded (e.g., not counted as being associated with DGA behavior). In yet another example implementation, the signature (e.g., child signature, such as described above) can also determine whether the domain name comprises only two segments (e.g., a two-segment check rule can verify that the domain name only includes two segments, such as abc.ru or abc-.com, which are in the form of hostname.TLD) as similarly described above. In yet another example implementation, the signature (e.g., child signature, such as described above) can also determine whether the domain name is on a list of known dynamic DNS (e.g., a dynamic DNS check rule can determine whether the domain name that was queried is on a list of (known/approved) dynamic DNS) as similarly described above. If so, then the DNS response is disregarded (e.g., not counted as being associated with DGA behavior). In yet another example implementation, the signature (e.g., child signature, such as described above) can also perform an entropy check rule and/or a dictionary check rule, such as similarly described above. Two or more combinations of the above-described additional analysis can be implemented by the signature (e.g., child signature, such as described above) to facilitate an accurate and efficient DGA behavior detection using the disclosed techniques, such as similarly described above.

At 806, applying a signature to the passive DNS data is performed using the security device to detect DGA behavior by determining whether the signature is triggered a threshold number of times within an interval (e.g., an interval equal to a predetermined period of time). An example burst of 38 NXDOMAIN responses has been observed in a 60 second period of time while monitoring an actual network environment in which DGA behavior was detected using the disclosed techniques. As such, an example threshold number of times can be configured to equal a value of 10, and an example predetermined period of time can be configured to equal 60 seconds, and/or other values can be configured for the threshold and the period of time settings for the signature (e.g., as would now be apparent to one of ordinary skill in the art, these settings can be tuned based on observed DGA behaviors, which can vary over time or for different network environments, and tuned to avoid or minimize false positives while still effectively detecting DGA behavior in the network environments). In an example implementation, the signature includes a child signature and a parent signature, in which the child signature detects NXDOMAIN responses, and the parent signature determines whether the child signature is triggered a threshold number of times within a predetermined period of time/interval, such as similarly described above with respect to FIG. 4.

At 808, an action is performed by the security device in response to the DGA behavior detection based on a policy (e.g., a firewall policy). For example, the action can include identifying one or more host devices that are associated with malware based on the DGA behavior detection based on determining that the one or more host devices attempted to connect to a domain name that triggered the NXDOMAIN response. In this example, the security device can perform various responsive actions (e.g., block, redirect, log, report, quarantine, and/or perform another action to respond to the determination that such host(s) may be infected with DGA/C&C malware and/or other malware).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system for Domain Generation Algorithm (DGA) behavior detection, comprising:
 a processor of a security device configured to:
  receive passive Domain Name System (DNS) data that comprises a plurality of DNS responses; and
  apply a signature to the passive DNS data to detect DGA behavior, wherein apply the signature to the passive DNS data to detect DGA behavior further comprises to:
   parse each of the plurality of DNS responses to determine whether one or more of the plurality of DNS responses correspond to a non-existent domain (NXDOMAIN) response, comprising to:
    determine whether a length of a top-level domain (TLD) of a domain name associated with a DNS response is equal to zero or is greater than three, the DNS response corresponding to the NXDOMAIN response; and
in response to a determination that the length of the TLD is equal to zero or is greater than three, disregard the DNS response with respect to the DGA behavior; and
a memory coupled to the processor and configured to provide the processor with instructions.

2. The system recited in claim 1, wherein the signature comprises an Intrusion Prevention System (IPS) signature.

3. The system recited in claim 1, wherein the NXDOMAIN response is in response to a DNS query from a host device for an NXDOMAIN.

4. The system recited in claim 1, wherein the NXDOMAIN response is in response to a DNS query from a host device for an NXDOMAIN, and wherein the NXDOMAIN response includes a destination IP address that corresponds to the host device.

5. The system recited in claim 1, wherein a plurality of NXDOMAIN responses are received at the security device, and wherein one or more distinct host devices are determined based on distinct IP addresses associated with one or more of the plurality of NXDOMAIN responses received at the security device.

6. The system recited in claim 1, wherein apply the signature to the passive DNS data to detect DGA behavior further comprises:
determine whether a threshold number of NXDOMAIN responses is received at the security device.

7. The system recited in claim 1, wherein apply the signature to the passive DNS data to detect DGA behavior further comprises:
determine whether a threshold number of NXDOMAIN responses is received at the security device within a predetermined period of time.

8. The system recited in claim 1, wherein the processor is further configured to:
determine that a first domain name is a DGA generated domain name based on detected DGA behavior using the signature, wherein the first domain name is associated with at least one of the one or more of the plurality of NXDOMAIN responses.

9. The system recited in claim 1, wherein the processor is further configured to:
determine that a first domain name is a DGA generated domain name based on detected DGA behavior using the signature, wherein the first domain name is associated with at least one of the one or more of the plurality of NXDOMAIN responses; and
sinkhole the first domain name using a sinkholed IP address.

10. The system recited in claim 1, wherein the processor is further configured to:
determine that a first domain name is a DGA generated domain name based on detected DGA behavior using the signature, wherein the first domain name is associated with at least one of the one or more of the plurality of NXDOMAIN responses; and
sinkhole the first domain name using the security device to redirect any host device that attempts to connect to the first domain name to a sinkholed IP address.

11. The system recited in claim 1, wherein the processor is further configured to:
determine that a first domain name is a DGA generated domain name based on detected DGA behavior using the signature, wherein the first domain name is associated with at least one of the one or more of the plurality of NXDOMAIN responses; and
sinkhole the first domain name using the security device to redirect any host device that attempts to connect to the first domain name to a sinkholed IP address, wherein the sinkholed IP address is associated with the security device.

12. The system recited in claim 1, wherein the processor is further configured to:
determine that a first domain name is a DGA generated domain name based on detected DGA behavior using the signature, wherein the first domain name is associated with at least one of the one or more of the plurality of NXDOMAIN responses; and
sinkhole the first domain name using the security device to redirect any host device that attempts to connect to the first domain name to a sinkholed IP address, wherein the sinkholed IP address is associated with a server.

13. The system recited in claim 1, wherein the processor is further configured to:
determine that a first domain name is a DGA generated domain name based on detected DGA behavior using the signature, wherein the first domain name is associated with at least one of the one or more of the plurality of NXDOMAIN responses; and
sinkhole the first domain name using the security device to redirect any host device that attempts to connect to the first domain name to a sinkholed IP address, wherein the sinkholed IP address is associated with a server of a cloud security service.

14. The system recited in claim 1, wherein the processor is further configured to:
determine that a first domain name is a DGA generated domain name based on detected DGA behavior using the signature, wherein the first domain name is associated with at least one of the one or more of the plurality of NXDOMAIN responses;
sinkhole the first domain name using a sinkholed IP address; and
monitor network activity redirected to the sinkholed IP address.

15. The system recited in claim 1, wherein the processor is further configured to:
determine that a first domain name is a DGA generated domain name based on detected DGA behavior using the signature, wherein the first domain name is associated with at least one of the one or more of the plurality of NXDOMAIN responses;
sinkhole the first domain name using a sinkholed IP address; and
identify a first host device that is infected with malware based on an attempt by the first host device to connect to the first domain name, wherein the first host device is redirected to the sinkholed IP address in response to the attempt by the first host device to connect to the first domain name.

16. The system recited in claim 1, wherein the processor is further configured to:
determine that a first domain name is a DGA generated domain name based on detected DGA behavior using the signature, wherein the first domain name is associated with at least one of the one or more of the plurality of NXDOMAIN responses;
sinkhole the first domain name using a sinkholed IP address; and generate a log for each attempted host device connection that is redirected to the sinkholed IP address.

17. The system recited in claim 1, wherein the processor is further configured to:
   determine that a first domain name is a DGA generated domain name based on detected DGA behavior using the signature, wherein the first domain name is associated with at least one of the one or more of the plurality of NXDOMAIN responses;
   sinkhole the first domain name using a sinkholed IP address; and
   report one or more host devices that attempt to connect to the sinkholed IP address.

18. The system recited in claim 1, wherein the processor is further configured to:
   determine that a first domain name is a DGA generated domain name based on detected DGA behavior using the signature, wherein the first domain name is associated with at least one of the one or more of the plurality of NXDOMAIN responses;
   determine one or more host devices that attempted to connect to the first domain name; and
   perform an action in response to determining the one or more host devices that attempted to connect to the first domain name.

19. A method of Domain Generation Algorithm (DGA) behavior detection, comprising:
   receiving passive Domain Name System (DNS) data that comprises a plurality of DNS responses at a security device; and
   applying a signature to the passive DNS data to detect DGA behavior using a processor of the security device, wherein applying the signature to the passive DNS data to detect DGA behavior further comprises:
      parsing each of the plurality of DNS responses to determine whether one or more of the plurality of DNS responses correspond to a non-existent domain (NXDOMAIN) response, comprising:
         determining whether a length of a top-level domain (TLD) of a domain name associated with a DNS response is equal to zero or is greater than three, the DNS response corresponding to the NXDOMAIN response; and
         in response to a determination that the length of the TLD is equal to zero or is greater than three, disregarding the DNS response with respect to the DGA behavior.

20. A computer program product for Domain Generation Algorithm (DGA) behavior detection, the computer program product being embodied in a tangible non-transitory computer readable storage medium and comprising computer instructions for:
   receiving passive Domain Name System (DNS) data that comprises a plurality of DNS responses; and
   applying a signature to the passive DNS data to detect DGA behavior, wherein applying the signature to the passive DNS data to detect DGA behavior further comprises:
      parsing each of the plurality of DNS responses to determine whether one or more of the plurality of DNS responses correspond to a non-existent domain (NXDOMAIN) response, comprising:
         determining whether a length of a top-level domain (TLD) of a domain name associated with a DNS response is equal to zero or is greater than three, the DNS response corresponding to the NXDOMAIN response; and
         in response to a determination that the length of the TLD is equal to zero or is greater than three, disregarding the DNS response with respect to the DGA behavior.

* * * * *